(12) United States Patent
Jun et al.

(10) Patent No.: US 11,385,655 B2
(45) Date of Patent: Jul. 12, 2022

(54) ROBOT CLEANER AND METHOD FOR CONTROLLING THE SAME

(71) Applicant: LG ELECTRONICS INC., Seoul (KR)

(72) Inventors: Woochan Jun, Seoul (KR); Sungbeom Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 16/670,143

(22) Filed: Oct. 31, 2019

(65) Prior Publication Data

US 2021/0064055 A1 Mar. 4, 2021

(30) Foreign Application Priority Data

Sep. 4, 2019 (KR) .................. 10-2019-0109497

(51) Int. Cl.
| | |
|---|---|
| *A47L 11/40* | (2006.01) |
| *G05D 1/02* | (2020.01) |
| *B25J 9/16* | (2006.01) |
| *A47L 9/28* | (2006.01) |
| *B25J 11/00* | (2006.01) |

(52) U.S. Cl.
CPC .......... *G05D 1/0274* (2013.01); *A47L 9/2826* (2013.01); *A47L 11/4011* (2013.01); *B25J 9/1666* (2013.01); *G05D 1/0246* (2013.01); *A47L 2201/04* (2013.01); *B25J 11/0085* (2013.01); *G05D 2201/0203* (2013.01)

(58) Field of Classification Search
CPC ............... A47L 2201/04; A47L 9/2826; A47L 2201/06; A47L 11/24; A47L 11/283; A47L 11/4038; G05D 2201/0203; G05D 2201/0215; G05D 1/0246; G05D 1/0238; B25J 11/0085; B25J 9/1664; B25J 9/1666; B25J 19/023; B25J 9/0003; Y10S 901/01; G05B 2219/45098
See application file for complete search history.

(56) References Cited

U.S. PATENT DOCUMENTS 8,560,119 B2 * 10/2013 Lee .................. G05D 1/027
700/258
9,946,263 B2   4/2018 Lindhé et al.
(Continued)

FOREIGN PATENT DOCUMENTS

KR   10-2007-0111888     11/2007
KR   10-2010-0134958 A   12/2010
(Continued)

OTHER PUBLICATIONS

Vassan et al., A Control Strategy for an Autonomous Robotic Vacuum Cleaner for Solar Panels, 2014, IEEE, p. 53-61 (Year: 2014).*

(Continued)

*Primary Examiner* — Mcdieunel Marc
(74) *Attorney, Agent, or Firm* — KED & Associates, LLP

(57) ABSTRACT

A robot cleaner may determine a climbable low height obstacle such as a threshold, a carpet, or the like in a cleaning area when the robot cleaner travels the cleaning area. The robot cleaner may be able to climb the obstacle after completing a travel of a region except for the corresponding obstacle.

17 Claims, 6 Drawing Sheets

(56) References Cited

U.S. PATENT DOCUMENTS

| | | | |
|---|---|---|---|
| 10,149,589 B2 | 12/2018 | Lindhé et al. | |
| 10,420,448 B2* | 9/2019 | Nam | A47L 9/1683 |
| 10,656,656 B2 | 5/2020 | Jun et al. | |
| 2006/0020369 A1* | 1/2006 | Taylor | A47L 9/2852 |
| | | | 700/245 |
| 2007/0271004 A1 | 11/2007 | Kim et al. | |
| 2010/0324734 A1* | 12/2010 | Lee | A47L 11/4011 |
| | | | 700/258 |
| 2012/0125363 A1* | 5/2012 | Kim | A47L 9/2852 |
| | | | 134/6 |
| 2015/0265125 A1* | 9/2015 | Lee | A47L 11/4061 |
| | | | 701/26 |
| 2016/0271795 A1* | 9/2016 | Vicenti | B25J 9/163 |
| 2018/0255997 A1* | 9/2018 | So | G05D 1/0219 |
| 2019/0176330 A1 | 6/2019 | Noh et al. | |
| 2019/0204847 A1* | 7/2019 | Noh | A47L 9/2842 |
| 2019/0320867 A1* | 10/2019 | Noh | A47L 9/2805 |
| 2020/0275814 A1 | 9/2020 | Jo | |
| 2020/0397207 A1* | 12/2020 | Shin | A47L 9/28 |
| 2021/0026367 A1* | 1/2021 | Yang | A47L 9/2889 |
| 2021/0138640 A1* | 5/2021 | Choi | B25J 9/1697 |

FOREIGN PATENT DOCUMENTS

| | | |
|---|---|---|
| KR | 10-2016-0100981 | 8/2016 |
| KR | 10-2018-0018211 A | 2/2018 |
| KR | 10-2018-0023302 | 3/2018 |
| KR | 10-2018-0085589 A | 7/2018 |
| KR | 10-2018-0094718 A | 8/2018 |
| TW | 2018-09724 A | 3/2018 |
| TW | 2019-14514 A | 4/2019 |

OTHER PUBLICATIONS

Megalingam et al., Staircase cleaning robot: Design considerations and a case study, 2016, IEEE, p. 0760-0764 (Year: 2016).*

Zhang et al., Cleaning Trajectory Evaluation of a Wall Cleaning Robot Based on Synthesis Standards, 2006, IEEE, p. 1695-1700 (Year: 2006).*

Meiting et al., Complete Coverage Path Planning of Wall-Cleaning Robot Using Visual sensor, 2007, IEEE, pg. (Year: 2007).*

International Search Report dated Jul. 13, 2020 issued in PCT/KR2020/000491.

Korean Office Action dated Jan. 4, 2021 issued in Application 10-2019-0109497.

Taiwan Office Action dated Jan. 14, 2021 issued in Application 109101107.

* cited by examiner

ROBOT CLEANER AND METHOD FOR CONTROLLING THE SAME

CROSS-REFERENCE TO RELATED APPLICATIONS

This application claims a benefit under 35 U.S.C. § 119(a) of Korean Patent Application No. 10-2019-0109497 filed on Sep. 4, 2019, on the Korean Intellectual Property Office, the entire disclosure of which is incorporated herein by reference for all purposes.

BACKGROUND

1. Field

The present disclosure relates to a robot cleaner and a method for controlling the same, and more particularly to, a robot cleaner and a method for controlling the same that, when there is an obstacle of a low height in a cleaning area, such as a threshold, carpet, or the like, may minimize travel of going up and down the corresponding obstacle.

2. Background

Typically, a robot cleaner may suck foreign matters such as dust from a floor face while traveling by itself within a region to be cleaned without user's manipulation. In other words, the robot cleaner refers to an apparatus that automatically cleans the region area to be cleaned.

Such a robot cleaner may perform cleaning via a cleaning path or automatic travel preset based on an embedded program. In order to perform the cleaning operation while traveling the path automatically, a large number of sensors are used to detect a position, a travel distance, an obstacle, and the like of the robot cleaner.

In one example, various obstacles may exist in the region to be cleaned by the robot cleaner. Further, various methods for controlling the robot cleaner are proposed for the robot cleaner to effectively clean the region to be cleaned with the obstacles.

For example, in order to determine whether to avoid or climb an obstacle, Patent Document 1 (10-2016-0100981, published on Aug. 24, 2016) discloses a control of sensing an obstacle using a front sensor while a robot cleaner travels, measuring angles of inclination before crossing the obstacle and while crossing the obstacle, and comparing the angles of inclination with each other to determine whether to climb the obstacle.

Further, in order to determine a cleaning order of regions where obstacles are located, Patent Document 2 (U.S. Ser. No. 09/946,263, published on Jun. 6, 2016) discloses a method in which a robot cleaner senses the obstacles using a front sensor, then divides regions to be cleaned in advance, then identifies the number of the obstacles in the region sensed by the sensor, then prioritizes the regions in order of ease of cleaning, and then controls a motion of the robot to preferentially clean a region that is easy to clean.

According to the above-described prior art, when there is an obstacle of a low height such as a step, a carpet, or the like in the cleaning area, since the robot cleaner repeatedly climbs and moves the obstacle without any avoidance operation while traveling the cleaning area, the robot cleaner may be restrained at a boundary of the obstacle or the obstacle may be caught by the robot cleaner.

PRIOR ART DOCUMENT

Patent Document

Patent Document 1 (KR10-2016-0100981, published on Aug. 24, 2016)
Patent Document 2 (U.S. Ser. No. 09/946,263, published on Jun. 6, 2016)
The above references are incorporated by reference herein where appropriate for appropriate teachings of additional or alternative details, features and/or technical background.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
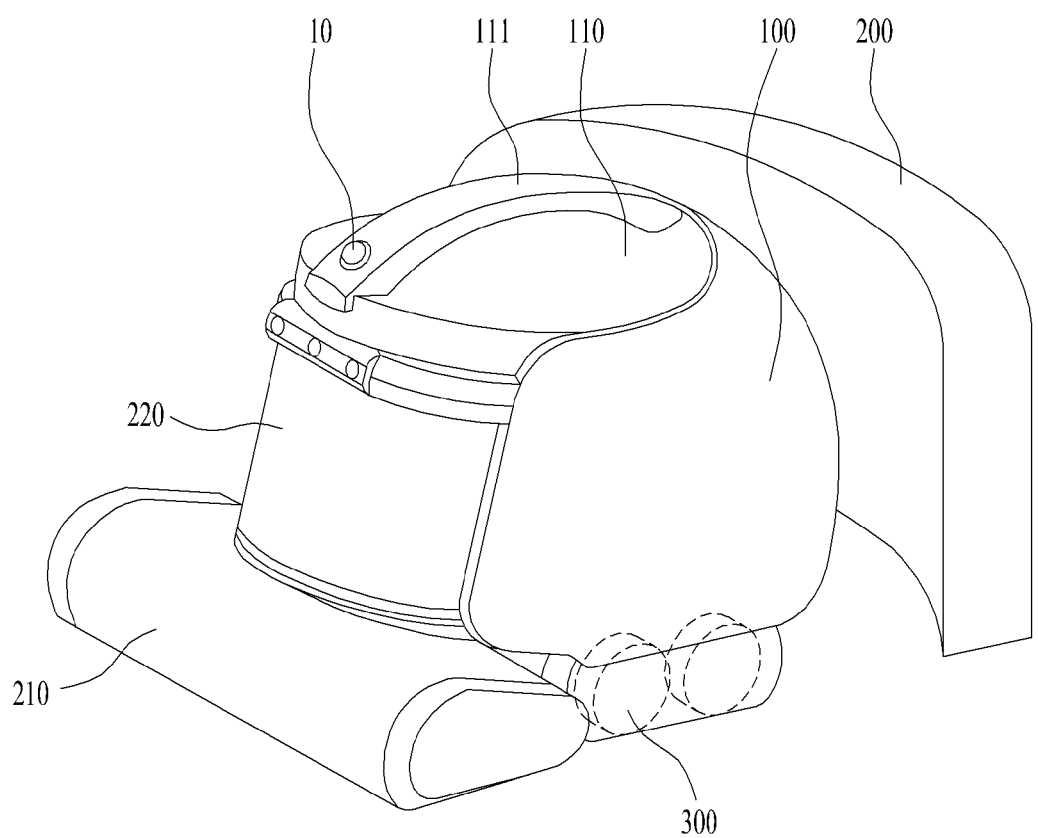
FIG. 1 is a perspective view illustrating a robot cleaner according to an exemplary embodiment of the present disclosure.
Figure 2:
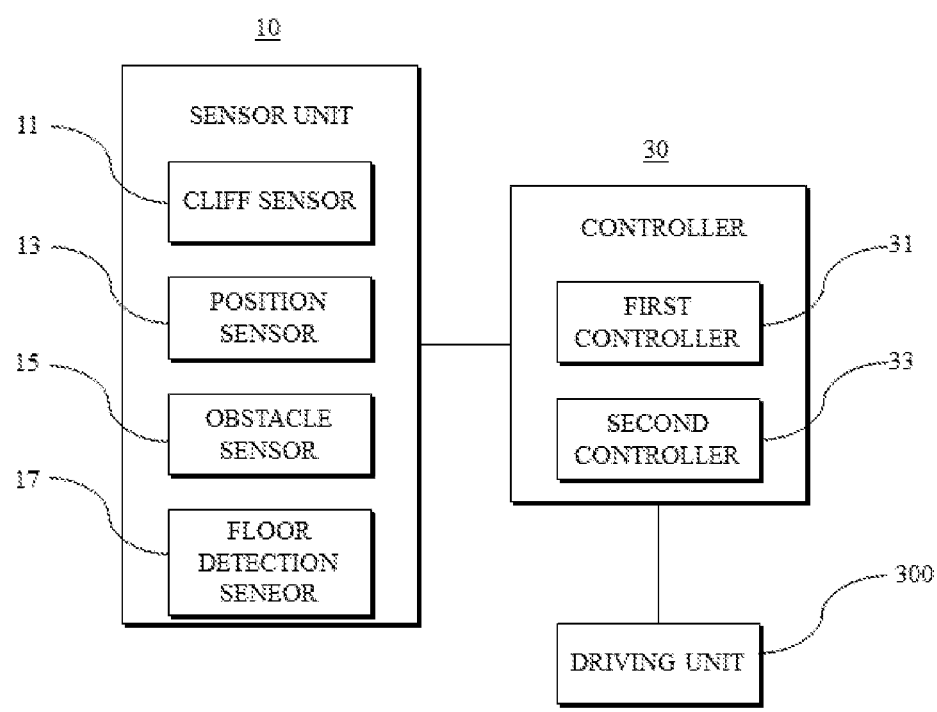
FIG. 2 is a block diagram illustrating a control system of a robot cleaner according to an exemplary embodiment of the present disclosure.

FIG. 1 is a perspective view illustrating a robot cleaner according to an exemplary embodiment of the present disclosure. FIG. 2 is a block diagram illustrating a control system of a robot cleaner according to an exemplary embodiment of the present disclosure.

Referring to FIG. 1, a robot cleaner of the present embodiment may include a body 100, cleaning units 210 and 220, a driving unit 300, a sensor unit 10, and a controller 30. Then, a battery (not shown) that provides power to electrically operate the cleaning units 210 and 220, the driving unit 300, and the sensor unit 10 may be further included.

The battery may be provided as a secondary battery and repeatedly charged. Therefore, a user may use the robot cleaner by repeatedly charging the battery without having to replace the battery or add a battery when a remaining quantity of the battery is small.

The robot cleaner may be coupled to a charging station 200 and charged. The charging station 200 may be formed to correspond to at least a portion of an outer surface of the robot cleaner. Thus, the robot cleaner may be reliably coupled to the charging station 200.

The body 100 may provide a space for parts of the robot cleaner to be embedded therein. Further, the cleaning unit 210 and 220, the driving unit 300, the sensor unit 10, and the controller 30 to be described below may be coupled to or embedded in the body 100. Thus, the body 100 of the robot cleaner may form the outer surface of the robot cleaner.

An upper cover 110 is disposed on a top of the body 100. The upper cover 110 may be hinge-coupled to one side of the body 100 to be pivotable. The upper cover 110 may be separated from the body 100 and detachable. In a state in which the upper cover 110 is disposed to cover a dust collector 220, separation of the dust collector 220 may be limited.

Then, a handle 111 is provided on a top of the upper cover 110 so that the user may grasp the handle 111 and pivot or detach the upper cover 110 from the body 100.

As the body 100 moves, the cleaning unit may perform cleaning of dust, foreign matters, and the like in a cleaning area. The cleaning unit may include a dust suction unit 210 for sucking the dust, a nozzle unit (not shown) for moving the sucked dust, a filter unit (not shown) for separating air and the dust from each other, and the dust collector 220 for collecting the dust therein. The nozzle unit and the filter unit are provided inside the body 100 to suck the dust, the foreign matters, and the like introduced using the dust suction unit 210 and filter the dust.

In addition, the cleaning unit is not limited as being illustrated in FIG. 1. For example, in FIG. 1, a rear-wheel-drive type robot cleaner in which the dust suction unit 210 is positioned at a front portion of the robot cleaner, the dust collector 220 is provided to have a predetermined height in the robot cleaner, and the driving unit 300 is positioned rearward relative to the dust suction unit 210 is illustrated, but the robot cleaner is not limited thereto. Robot cleaners with various shapes such as a front-wheel-drive type robot cleaner in which the dust suction unit is positioned at a rear portion of the robot cleaner, a robot cleaner having a shape in which the dust collector 200 is disposed inside the body 100 and is not exposed to the outside, or the like.

While the robot cleaner travels the cleaning area, the dust suction unit 210 may operate to suck in dust, foreign matter, or the like on a floor. In this connection, since the dust and the air are sucked together, the air and the dust moved to the nozzle unit may be separated from each other by the filter unit. The air passed through the filter unit is discharged back to the outside and the sucked dust or foreign matter may be accommodated in the dust collector 220.

The filter unit may be provided in a form of a filter or may be provided to separate the air and the dust in a structural scheme using a cyclone phenomenon.

The dust collector may be provided detachably. When the dust collector is full while the cleaning or after the cleaning, the user may recognize, by a display panel (not shown) or the like, that the dusts collector is full. When the dust collector is full, the dust inside the dust collector may be emptied to perform the cleaning again smoothly.

The cleaning unit may be coupled to the body 100. The cleaning unit and the body 100 are not necessarily provided separately and may be integrally formed. However, in order for effective cleaning, the dust suction unit 210 may be provided in a polygonal shape to clean a large region. In particular, since the robot cleaner generally performs a straight travel, the suction unit may be preferably provided in a quadrangle.

The driving unit 300 may move the body 100. Therefore, it is preferable that the driving unit 300 may be provided in a form of wheels and a motor is provided to provide a driving force to the wheels. Further, the wheels may be provided at left and right sides of the body 100, respectively.

The wheels may be rotated clockwise or counterclockwise to move or rotate to front, rear, left, and right sides of the body 100. In addition, the wheels may drive independently of each other. To this end, the wheels may be driven by different motors.

As the controller controls the driving of the driving unit 300, the robot cleaner may travel a floor of the cleaning area. The wheel is located below the body 100 to travel the body 100. The wheel may be composed of only circular wheels, of circular rollers connected with each other by a belt chain, or of a combination of the circular wheels and the circular rollers connected with each other by the belt chain. Then, an upper portion of the wheel may be placed inside the body 100 and a lower portion of the wheel may protrude downward of the body 100.

Referring to FIG. 2, the sensor unit and the controller of the present embodiment will be described. The sensor unit 10 may collect external environment information required for autonomous travel of the robot cleaner. Then, the travel of the robot cleaner may be controlled by controlling the driving unit 300 based on the external environment input from the sensor unit 10.

For example, the sensor unit 10 may include an imaging sensor (not shown) that photographs surroundings to create a travel map, a floor detection sensor 17 that detects a material of the floor, a cliff sensor 11 that may sense a height of a floor face to be traveled by the robot cleaner or an amount of light reflected from the floor face, a position sensor 12 that determines a current position of the robot cleaner within the cleaning area, an obstacle sensor 13 that senses the obstacle, and the like. In one example, in order for the robot cleaner to recognize the external environment more accurately, additional sensors other than the above-described sensors may be further provided.

For example, a wall detection sensor (not shown) may be included. The robot cleaner may receive information about a cleaning target area by the wall detection sensor, the imaging sensor, the cliff sensor, and the like. That is, while the robot cleaner is traveling, a spatial shape of the cleaning target area may be input by the imaging sensor, the cliff sensor, and the like and the cleaning target area may be segmented into a plurality of cleaning areas by the wall detection sensor.

However, the present disclosure is not limited to the above-described example, which is merely an embodiment, and the imaging sensor, the cliff sensor 11, or the obstacle sensor 13 may simultaneously perform wall sensing.

In one example, the obstacle described in the present disclosure collectively refers to an obstacle that the robot cleaner is unable to climb such as a wall and an obstacle that the robot cleaner is able to climb such as a carpet, a mat, and a threshold. Therefore, in a paragraph, the meaning of the obstacle may be defined by whether the robot cleaner is able climb the obstacle.

The imaging sensor may sense only the cleaning target area and the position sensor 12 may specify the position of the body 100 to specify the cleaning area where the robot cleaner performs the cleaning. As the position of the robot cleaner in the cleaning area is specified, movement in the cleaning area, or movement to the next cleaning area may be performed.

In an example of the specifying of the cleaning area and the position of the robot cleaner, the robot cleaner may perform mapping while traveling the cleaning target area and form a grid in a space of the cleaning target area set by the mapping. A position of the robot cleaner in the grid may be specified as a coordinate value. In one example, this corresponds to one embodiment, and the mapping of the cleaning area and the specifying of the position of the robot cleaner may be performed by various methods.

Further, the floor detection sensor 17 may be a sensor for sensing the material of the floor. The cleaning target area where the robot cleaner is used may vary for each user. For example, the floor material of the cleaning target area may be marble or a floor paper. Further, the floor may be formed of a material other than the above-described examples.

Depending on the material of the floor material, an intensity at which the dust suction unit 210 is driven to effectively suck the dust may vary. For example, the dust suction unit 210 should be operated more strongly in a region with the carpet than when the cleaning is performed on a general floor paper to effectively perform the cleaning. The controller 30 of the robot cleaner may be provided to control the operation intensity of the dust suction unit 210 based on a type of the floor material.

The obstacle sensor 15 may determine whether the obstacle exists in the cleaning target area. The obstacle sensor 15 may be provided integrally with or separately from the above-described imaging sensor, cliff sensor, or the like. In other words, the obstacle sensor 15 may serve as the imaging sensor.

As the obstacle sensor 15 senses the obstacle, the travel path of the robot cleaner may change. In detail, when the robot cleaner senses the obstacle such as the wall while traveling, the robot cleaner is moved to bypass the obstacle.

However, when a conventional robot cleaner senses an obstacle while traveling and it is determined by the cliff sensor 11 that the obstacle has a low height and therefore the robot cleaner is able to climb the obstacle, the robot cleaner will move along an initially input travel path and climb the obstacle. In this case, when the low height obstacle is the obstacle such as the carpet, the mat, or the threshold, as the robot cleaner moves along the initially input travel path, the robot cleaner continuously goes up and down a boundary step of the obstacle. As a result, a restraint phenomenon, increase of battery consumption, stopping of the travel of the robot cleaner due to the obstacle, and the like may occur. Therefore, the present embodiment is intended to provide a method for controlling the robot cleaner that allows the robot cleaner to bypass the obstacle even in a case in which the obstacle has a height low enough to be climbed, perform the cleaning, and then climb the low height obstacle. Further, this will be described below.

As described above, the controller 30 basically controls the travel of the robot cleaner depending on the external environment inputted from the sensor unit. In FIG. 2, a first controller that determines whether the body is able to climb the obstacle based on information recognized by the cliff sensor 11 and a second controller that sets a boundary of the obstacle and defines an obstacle region in the cleaning area are illustrated.

However, the functions of the controller and the components of the controller are not necessarily limited thereto. The first controller may control the travel of the robot cleaner after determining whether the body is able to climb the obstacle. Further, the second controller may control the travel of the robot cleaner after defining the cleaning area. Further, as described above, the material of the floor may be determined based on the external environment input by the floor detection sensor 17.

The first controller 31 may measure a height change value from the floor face to the obstacle based on the information recognized by the cliff sensor 11 and then determine whether the body 100 is able to climb the obstacle. When the obstacle is determined to be out of a body's climbable range, the first controller 31 may change the travel path of the body 100.

In addition, when the obstacle is determined within the climbable range of the body 100, the second controller 33 may set the boundary of the obstacle by the position sensor 13 and define the obstacle region in the cleaning area. Then, when the obstacle interferes with the robot cleaner on the travel path of the body 100, the travel path of the robot cleaner may be changed.

The case in which the obstacle interferes with the robot cleaner means a case in which the robot cleaner climbs the low height obstacle by the cliff sensor 11, the shooting sensor, and the like.

According to the robot cleaner and the method for controlling the same of the present embodiment to be described below, while mapping the cleaning area, the robot cleaner may store a boundary position of the low height obstacle, travel the cleaning area, determine whether the region of the obstacle is able to be defined, and then define the region of the obstacle. Further, while cleaning, the robot cleaner may define first and second regions 1 and 2 including the second region 2, which is defined by the boundary of the obstacle and the first region 1, which is defined as a region other than the second region in the cleaning area. After cleaning the first region 1, the robot cleaner may enter the second region 2.

Therefore, even when the obstacle of the low height that may be climbed during the travel of the robot cleaner is recognized as described above, when the condition (defining the region of the obstacle during the mapping and completing the cleaning of the first region 1) is not satisfied, the robot cleaner does not climb the obstacle, but travels the cleaning area.

The low height obstacle means, for example, the carpet, the mat, and the threshold. Further, the carpet and mat itself may be set as the cleaning target region. As described above, the carpet and the mat may be entered and cleaned after cleaning the floor face. Then, in the case of the threshold, after cleaning of one of the cleaning areas segmented by the threshold is completed, the robot cleaner may perform the climbing to move to another cleaning area and perform cleaning of another cleaning area. In one example, even in the case of the threshold, since the robot cleaner may perform the cleaning at the same time as climbing, the threshold may be distinguished as the cleaning area.

Figure 3:
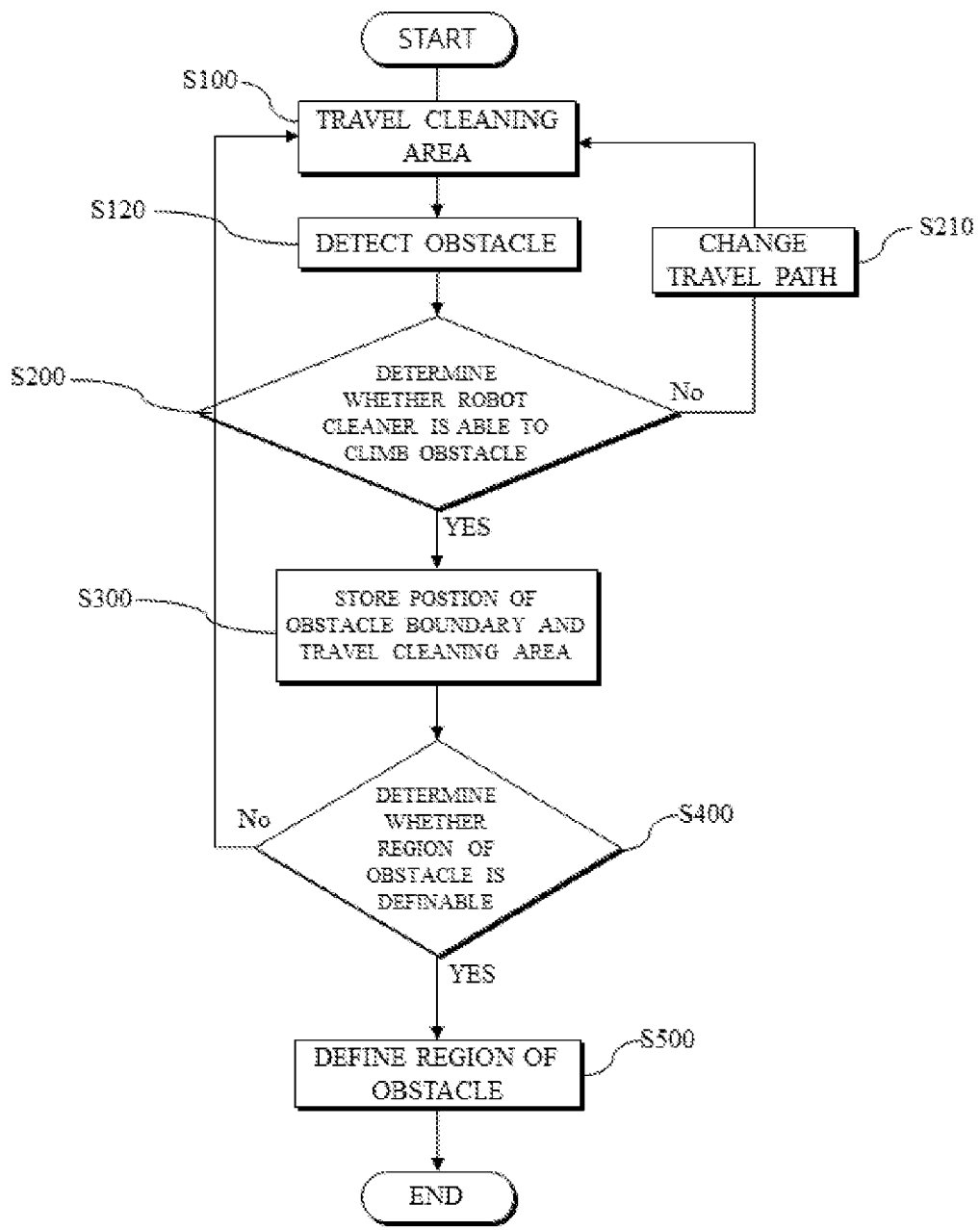
FIGS. 3 and 4 are flowcharts illustrating a method for controlling a robot cleaner according to an exemplary embodiment of the present disclosure.
Figure 4:
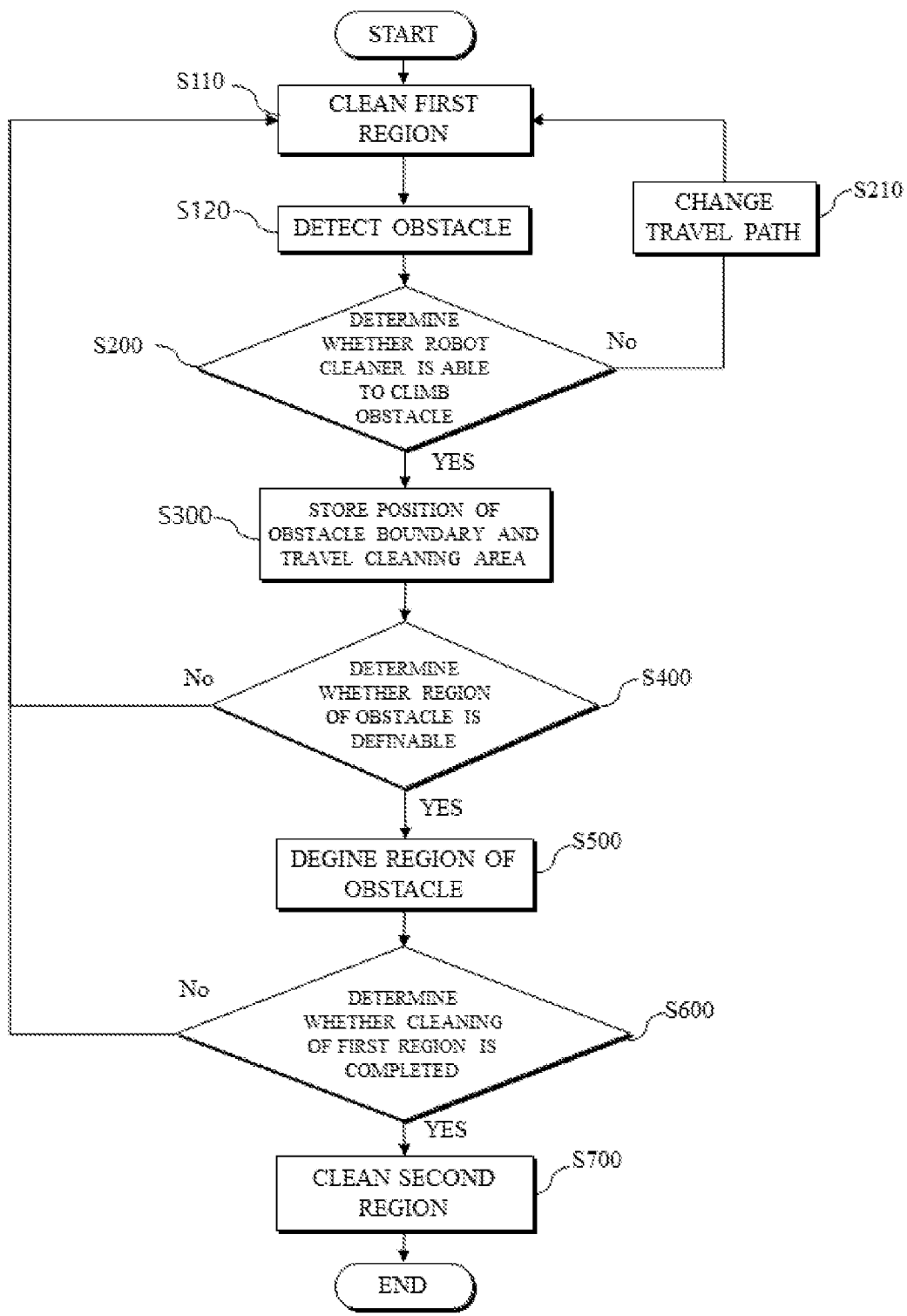

FIGS. 3 and 4 are flowcharts illustrating a method for controlling a robot cleaner according to an exemplary embodiment of the present disclosure. Operations of the robot cleaner described in each flowchart may be performed by various robot cleaners including the above-described components.

Referring to FIG. 3, the body 100 of the robot cleaner travels the cleaning area (S100) and then senses the obstacle during the travel (S120). When the robot cleaner senses the obstacle, the robot cleaner determines whether the robot cleaner is able to climb the obstacle (S200). When the robot cleaner is able to climb the obstacle, the robot cleaner stores the position of the obstacle boundary and then travels the cleaning area (S300).

Then, when the robot cleaner is not able to climb the obstacle, the robot cleaner changes the travel path (S210) to travel the cleaning area. In one example, when the robot cleaner stores the boundary position of the obstacle and travels the cleaning area in S300, and when the obstacle is positioned on the travel path of the robot cleaner and interferes with the travel of the robot cleaner as described above, the robot cleaner avoids the obstacle and travels the cleaning area.

In detail, the cleaning area may include the second region 2 defined by the boundary of the obstacle and the first region 1 defined as the remaining region other than the second region 2. The robot cleaner stores the boundary position of the obstacle and then travels the first region 1 of the cleaning area.

In one example, the robot cleaner determines whether the region of the obstacle is definable (S400) while traveling the cleaning area from the boundary of the obstacle. This is because the robot cleaner is able to define the region of the obstacle after storing the boundary position of the obstacle and after storing position data for defining the region of the obstacle.

Therefore, when the obstacle boundary position data is not stored enough to define the region of the obstacle, the robot cleaner travels the cleaning area again (S100). When the obstacle boundary position data is stored enough to define the region of the obstacle, the robot cleaner defines the region of the obstacle (S500).

In addition, the travel of the cleaning area of the present embodiment may mean continuous travel or may mean discontinuous travel. The continuous travel may repeatedly perform, at the same time as the storing of the obstacle boundary position and the traveling, by the robot cleaner, of the cleaning area are started in S300, a series of steps of determining whether the region of the obstacle is definable, traveling the cleaning area defined as a non-obstacle region upon determination that the region of the obstacle is definable, traveling again the cleaning area to sense the obstacle upon determination that the region of the obstacle is not definable, and determining the obstacle boundary position.

The discontinuous travel may be understood as stopping the traveling while performing each process in the above-described steps and then traveling again.

The above-described series of steps may be performed at the step of mapping the cleaning target area before the robot cleaner starts the cleaning. In the mapping step, the second region 2 defined by the boundary of the obstacle and the first region 1 other than the second region 2 are defined. In the step of mapping the cleaning area, the mapping may be performed without climbing a boundary step of the second region 2. In the cleaning of the cleaning area, after the cleaning of the first region 1 is completed, the second region 2 may be entered and the cleaning of the second region 2 may be completed. That is, the step boundary of the second region 2 may be climbed to the minimum.

FIG. 4 is a diagram illustrating a series of flows of defining the region of the obstacle while cleaning the cleaning area, then cleaning the non-obstacle region other than the obstacle region, and then entering the obstacle region.

The robot cleaner performs the cleaning while traveling the cleaning area. In detail, the robot cleaner performs the cleaning of the first region 1 (S110) and detects the obstacle present in the cleaning area (S120). The robot cleaner detected the obstacle determines whether the robot cleaner is able to climb the obstacle (S200). Upon determination that the robot cleaner is able to climb the obstacle, the robot cleaner stores the position of the boundary of the obstacle and travels the first region 1. Then, upon determination that the robot cleaner is unable to climb the obstacle, the robot cleaner changes the travel path thereof S210 to perform the travel of the first region 1.

In addition, even when the robot cleaner is determined to be able to climb the obstacle, the robot cleaner does not climb the obstacle. Further, when the obstacle interferes with the robot cleaner on the travel path thereof, the robot cleaner changes the travel path to travel the first region 1 while avoiding the obstacle.

Then, the robot cleaner determines whether the region of the obstacle is definable (S400). Upon determination that the obstacle region is definable by the stored position of the obstacle boundary, the robot cleaner defines the obstacle region (S500). Further, upon determination that the obstacle region is not definable, the robot cleaner travels the first region 1.

After the obstacle region is defined, the robot cleaner determines whether the cleaning of the first region 1 is completed. Whether the cleaning of the first region 1 is completed may mean that determining whether the first region 1 travel of the robot cleaner is completed. Therefore, when the cleaning of the first region 1 is not completed, the robot cleaner resumes the cleaning while traveling the first region 1. Further, when the cleaning of the first region 1 is determined to be completed, the robot cleaner enters the second region 2 and performs the cleaning (S700).

Figure 5:
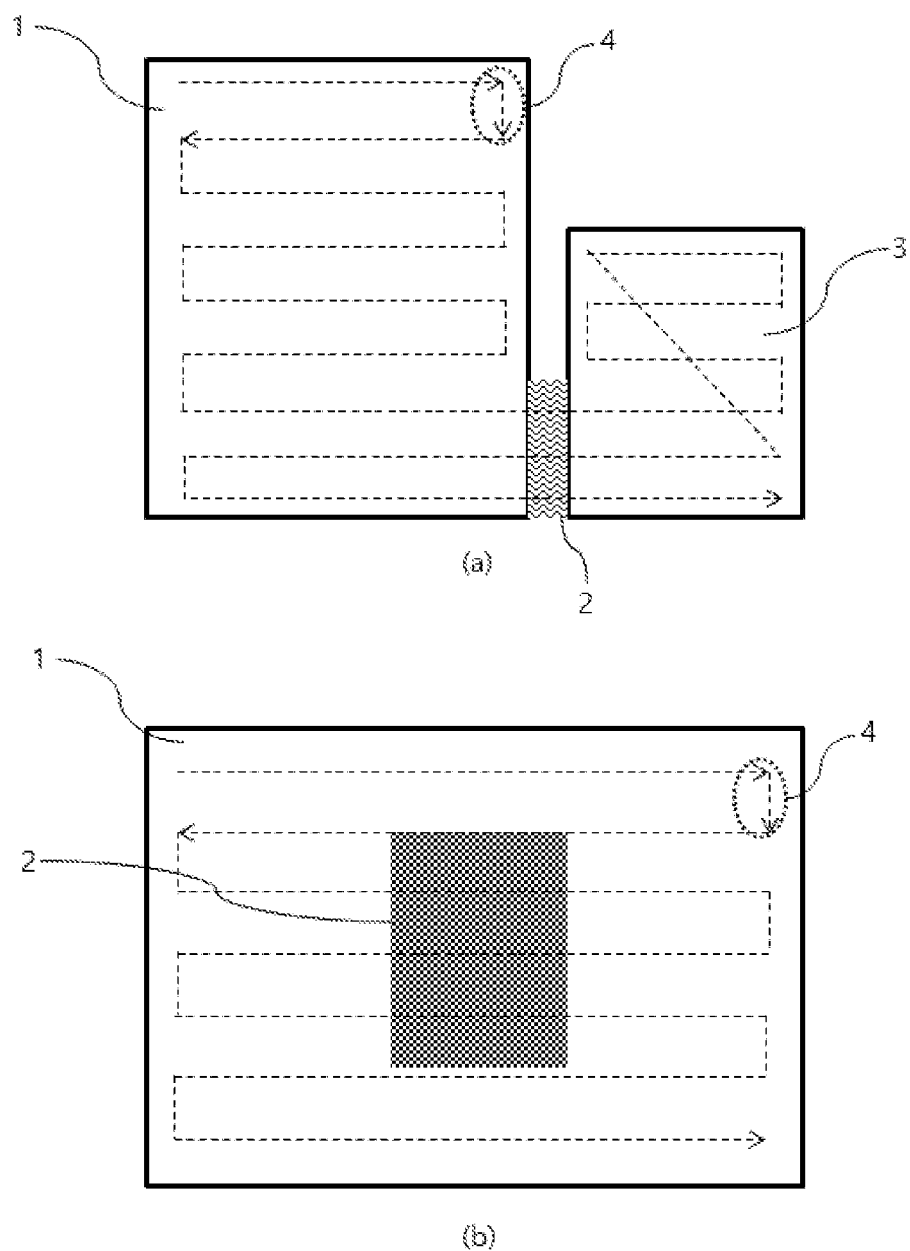
FIG. 5 is a view illustrating a cleaning area travel of an existing robot cleaner.

FIG. 5 is a view illustrating a cleaning area travel of an existing robot cleaner. In FIG. 5A, a first region 1 and a third region 3 are separated from each other by a second region 2 defined as a threshold boundary. In FIG. 5B, the cleaning area is divided into a second region 2 defined as a boundary of the carpet, mat, or the like and a first region 1 other than the second region 2.

Referring to FIG. 5, when an obstacle such as a wall that the robot cleaner is unable to climb is detected while traveling in the first region 1, a conventional robot cleaner changes a travel path of the robot cleaner at the wall 4 and then travel the first region 1.

Then, when an obstacle with a height low enough to climb, such as the second region 2, is detected, the robot cleaner goes up and down a boundary step of the obstacle while climbing the obstacle.

In other words, after determining whether the robot cleaner is able to climb the obstacle detected in the cleaning area, when the height of the obstacle is out of a climbable range of the robot cleaner, the robot cleaner changes the travel path thereof to avoid the obstacle. However, when the height of the obstacle is low enough to climb, the robot cleaner climbs the obstacle and travels the cleaning area without changing the travel path thereof.

In this case, as described above, a restraint phenomenon of the robot cleaner may occur as the boundary step of the obstacle is repeatedly climbed. Alternatively, jamming of the obstacle may occur at the boundary of the obstacle. Alternatively, the battery consumption of the robot cleaner may increase due to the continuous climbing travel.

Figure 6:
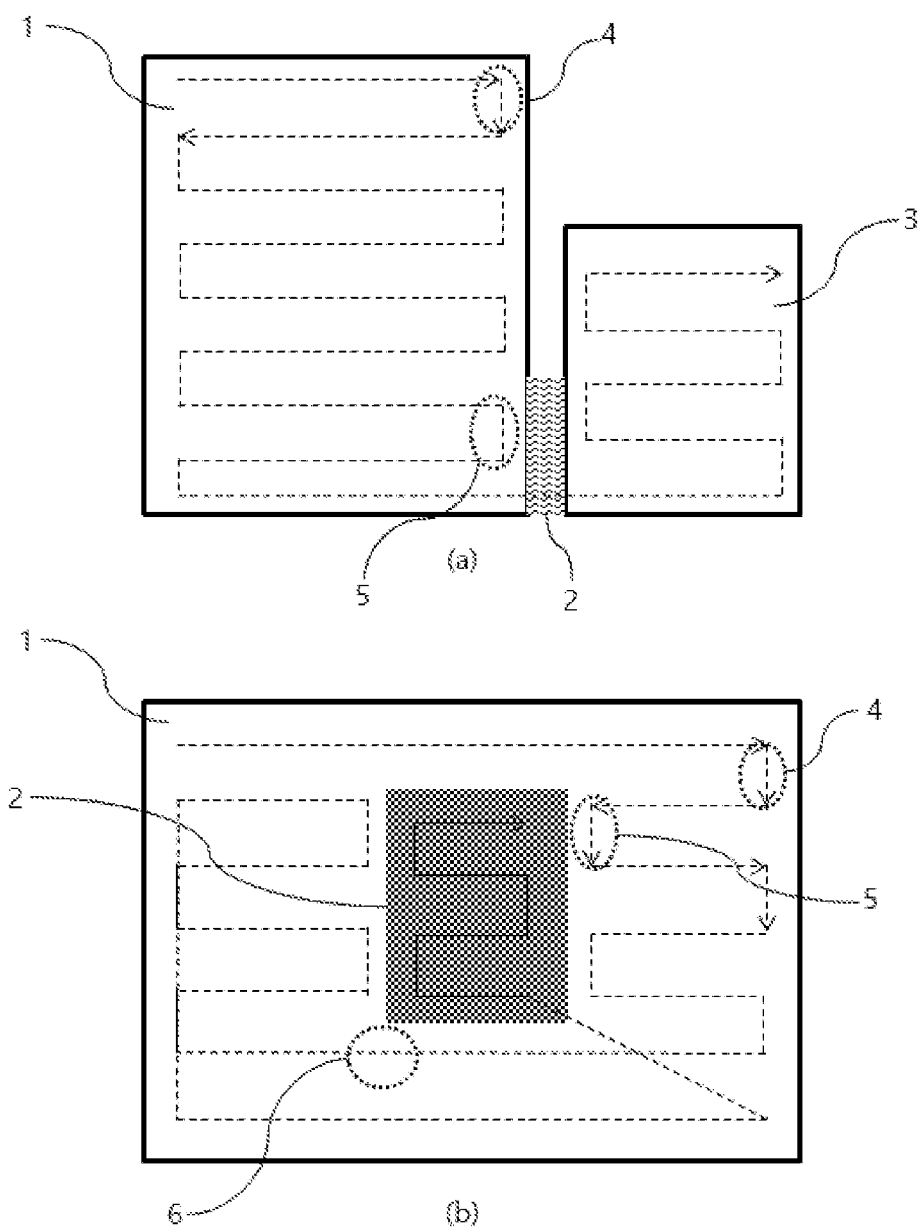
FIG. 6 is a view illustrating a cleaning area travel of a robot cleaner according to an exemplary embodiment of the present disclosure.

FIG. 6 is a view illustrating a cleaning area travel of a robot cleaner according to an exemplary embodiment of the present disclosure. In FIG. 6A, a first region 1 and a third region 3 are separated from each other by a second region 2 defined as a threshold boundary. In FIG. 6B, the cleaning area is divided into a second region 2 defined as a boundary of the carpet, mat, or the like and a first region 1 other than the second region 2.

Referring to FIG. 6A, a robot cleaner of the present embodiment detects an obstacle while performing cleaning of the first region 1. Further, when the robot cleaner is unable to climb an obstacle, the robot cleaner changes a travel path thereof 4 to travel the first region 1. Then, even when the robot cleaner is able to climb the obstacle, the robot cleaner changes the travel path thereof 5 to travel the first region 1. When the robot cleaner is able to climb the obstacle, the robot cleaner may store a boundary position of the obstacle as described above and may divide the second region 2 defined by the boundary of the obstacle from the first region 1.

Then, after cleaning of the first region 1 is completed, the robot cleaner climbs the second region 2 and enters the third region 3 to perform cleaning of the third region 3.

Referring to FIG. 6B, a robot cleaner of the present embodiment senses the obstacle while performing cleaning of the first region 1. When the robot cleaner is unable to climb the obstacle, the robot cleaner changes a travel path thereof 4 to travel the first region 1. Then, even when the robot cleaner is able to climb the obstacle, when the obstacle interferes with the robot cleaner on the travel path thereof, the robot cleaner changes the travel path thereof 5 to travel the first region 1.

That is, when the obstacle is positioned on the travel path of the robot cleaner and the robot cleaner needs to climb the obstacle, the robot cleaner changes the travel path thereof 5. When the obstacle is positioned out of the travel path of the robot cleaner and does not interfere with the movement of the robot cleaner, the robot cleaner travels 6 without changing the travel path thereof.

In other words, the robot cleaner moves along the boundary of the obstacle to store the position of the obstacle boundary, then defines the region of the obstacle, then completes the cleaning of the first region 1, and then enters the second region 2, thereby minimizing the climbing of the obstacle boundary step.

Although the exemplary embodiments of the present disclosure have been described in detail above, those skilled in the art to which the present disclosure belongs will understand that various modifications may be made to the above-described embodiments without departing from the scope of the present disclosure. Therefore, the scope of the present disclosure should not be limited to the embodiments described and should be determined by the claims to be described later as well as those equivalent to the claims.

Accordingly, the various embodiments disclosed by the present disclosure are intended to solve the problems of the robot cleaner described above.

One of the various challenges of the present disclosure is to provide a robot cleaner and a method for controlling the same in which the robot cleaner may travel a cleaning area while minimizing the number of climbing low height obstacles in the cleaning area.

One of the various challenges of the present disclosure is to provide a robot cleaner and a method for controlling the same in which, when a cleaning area is defined by a threshold, the robot cleaner may climb the threshold to clean the remaining cleaning area after completing cleaning of the cleaning area where the robot cleaner is located.

One of the various challenges of the present disclosure is to provide a robot cleaner and a method for controlling the same in which, when there is a region such as a carpet and a mat that the robot cleaner needs to climb the region to perform cleaning, after completing cleaning of a cleaning area where the robot cleaner is located, the robot cleaner may climb a low height obstacle such as the carpet and the mat and then perform the cleaning.

One of the various challenges of the present disclosure is to provide a robot cleaner and a method for controlling the same in which cleaning may be performed while avoiding a climbable low height obstacle in a cleaning area.

In order to solve the various challenges of the present disclosure, an exemplary embodiment of the present disclosure is to provide an improved travel method for a robot cleaner to reduce a restraint of the robot cleaner that may occur at obstacles of climbable height in a cleaning area.

An exemplary embodiment according to the present disclosure is to provide a robot cleaner and a method for controlling the same in which the robot cleaner may avoid an obstacle of a climbable height in a cleaning area, then perform all of cleaning of the cleaning area and mapping, and then climb the obstacle.

An exemplary embodiment according to the present disclosure is to provide a robot cleaner and a method for controlling the same that may minimize travel at a boundary with an obstacle step of a climbable height.

In an aspect of the present disclosure, there is provided a method for controlling a robot cleaner, the method including when the robot cleaner approaches an obstacle in a cleaning area, determining whether the robot cleaner is able to climb the obstacle, upon determination that the robot cleaner is able to climb the obstacle, storing a position of a boundary of the obstacle, after storing the position of the boundary, traveling, by the robot cleaner, from the boundary of the obstacle to the cleaning area, and defining a region of the obstacle in the cleaning area based on the boundary.

In one implementation, the method may further include upon determination that the robot cleaner is unable to climb the obstacle, changing a travel path of the robot cleaner. In one implementation, when the region of the obstacle is not definable based on the boundary, the robot cleaner may travel the cleaning area. In one implementation, each of the determining step, the storing step, the traveling step, and the defining step may be performed while mapping the cleaning area and before the robot cleaner starts cleaning.

In one implementation, each of the determining step, the storing step, the traveling step, and the defining step may be performed while the robot cleaner performs cleaning. In one implementation, the cleaning area may include a second region defined by the boundary of the obstacle and a first region defined as a region other than the second region. The defining step may include defining the first region and the second region in the cleaning area.

In one implementation, the robot cleaner may enter the second region after completing cleaning of the first region. In one implementation, the robot cleaner may enter the second region, then complete cleaning of the second region, and then leave the second region.

In one implementation, when the obstacle interferes with the robot cleaner while the robot cleaner is traveling, the robot cleaner may change a travel path thereof.

In another aspect of the present disclosure, a robot cleaner includes a body for traveling a cleaning area, a cliff sensor disposed on the body for measuring a height change value, a position sensor for tracking and storing a position of the body, a first controller that determines whether the body is able to climb an obstacle based on information recognized by the cliff sensor, and a second controller that upon determination that the body is able to climb the obstacle, obtains a boundary of the obstacle using the position sensor and defines a region of the obstacle in the cleaning area based on the boundary.

In one implementation, the cleaning area may include the obstacle region and a non-obstacle region other than the obstacle region. The body may have cleaned the non-obstacle region and then enter and clean the obstacle region.

In one implementation, upon determination that the robot cleaner is unable to climb the obstacle, the first controller may change a travel path of the robot cleaner. In one implementation, upon determination that the obstacle region is not definable based on the boundary of the obstacle, the second controller may perform travel of the body.

In one implementation, when the obstacle interferes with the robot cleaner, the second controller may change the travel path of the robot cleaner.

In one implementation, the cleaning area may include the obstacle region and a non-obstacle region other than the obstacle region. The body may have cleaned the non-obstacle region, then enter the obstacle region, and then leave the obstacle region.

Each of the features of the above-described embodiments may be implemented in a combined manner in other embodiments as long as they are not inconsistent or exclusive with other embodiments.

According to an exemplary embodiment of the present disclosure, travel of going up and down a boundary of an environment (a mat, a carpet, a threshold, or the like) having a step in the cleaning area is minimized to reduce a restraint of the robot cleaner and increase an emotional quality of the travel.

Further, restraint and sensor misdetection that may occur in a cleaning environment with a step may be reduced.

Further, intensive cleaning may be performed in a region where an environment of a floor face varies, such as the carpet or the mat.

Further, when creating a map of the cleaning area, the region of the climbable obstacle is defined, which enables more accurate defining of the cleaning area.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot, the method comprising:
    determining whether the robot is able to travel over an obstacle in a cleaning area, wherein an obstacle boundary forms a step in the cleaning area;
    storing position information of the obstacle boundary when the robot is determined to be able to travel over the obstacle;
    after storing the position information, traveling, by the robot, from the obstacle boundary to the cleaning area; and
    defining, in the cleaning area, a region of the obstacle based on the obstacle boundary,
    wherein the cleaning area includes:
        a second region defined by the obstacle boundary; and
        a first region defined as a region other than the second region,
    wherein the defining of the region includes defining, in the cleaning area, the first region and the second region,
    wherein after competing cleaning of the first region, the robot is to enter into the second region.

2. The method of claim 1, further comprising:
    changing a travel path of the robot when the robot is determined to be unable to travel over the obstacle.

3. The method of claim 2, wherein when the region of the obstacle is not definable based on the obstacle boundary, the robot is to travel about the cleaning area.

4. The method of claim 3, wherein each of the determining, the storing, the traveling, and the defining is performed while mapping the cleaning area and prior to the robot performing cleaning.

5. The method of claim 3, wherein each of the determining, the storing, the traveling, and the defining are performed while the robot is performing cleaning.

6. The method of claim 1, wherein the robot is configured to:
    enter the second region,
    complete cleaning of the second region, and
    leave the second region after complete cleaning of the second region.

7. The method of claim 1, wherein when the obstacle is to interfere with the robot while the robot is traveling within the cleaning area, the robot is to change a travel path within the cleaning area.

8. A robot comprising:
    a body to travel within a cleaning area;
    a cliff sensor disposed on the body to determine a height of an object;
    a position sensor to determine a position of the body;
    a controller configured to:
        determine whether the body is able to travel over an obstacle based on information from the cliff sensor,
        obtain an obstacle boundary using the position sensor when the body is determined to be able to travel over the obstacle, and
        define, in a cleaning area, an obstacle region of the obstacle based on the obstacle boundary, wherein the obstacle boundary forms a step in the cleaning area,
    wherein the cleaning area includes the obstacle region and a non-obstacle region other than the obstacle region, wherein after the robot has cleaned the non-obstacle region, the robot enters the obstacle region and cleans the obstacle region.

9. The robot of claim 8, wherein the controller is configured to change a travel path of the robot when the robot is determined to be unable to travel over the obstacle.

10. The robot of claim 9, wherein the controller is configured to perform travel of the body when the obstacle region is determined to not be definable based on the obstacle boundary.

11. The robot of claim 10, wherein the controller is configured to change the travel path of the robot when the obstacle is to interfere with the robot.

12. The robot of claim 8, wherein after the robot has cleaned the non-obstacle region, the robot enters the obstacle region, and then leaves the obstacle region.

13. A method of a robot, the method comprising:
    travelling within a cleaning area;
    sensing a height of an obstacle in the cleaning area;
    determining whether the robot can travel over the obstacle based on the sensed height;
    storing position information of an obstacle boundary of the obstacle when the robot is determined to be able to travel over the obstacle;
    after storing the position information, travelling from the obstacle boundary within the cleaning area; and
    determining an obstacle region in the cleaning area based on the obstacle boundary.

14. The method of claim 13, comprising:
    determining a non-obstacle region in the cleaning area.

15. The method of claim 14, comprising:
    entering the non-obstacle region; and
    performing cleaning in the non-obstacle region.

16. The method of claim 15, comprising:
    entering the obstacle region; and
    after entering the obstacle region, performing cleaning in the obstacle region.

17. The method of claim 13, comprising changing a travel path of the robot when the robot is determined to not be able to travel over the obstacle.

* * * * *